(12) United States Patent
Hady

(10) Patent No.: US 8,719,454 B2
(45) Date of Patent: May 6, 2014

(54) ENABLING PERIPHERAL COMMUNICATION IN A LOCAL AREA NETWORK

(75) Inventor: Frank Hady, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1147 days.

(21) Appl. No.: 12/077,357

(22) Filed: Mar. 19, 2008

(65) Prior Publication Data

US 2009/0241179 A1 Sep. 24, 2009

(51) Int. Cl.
*G06F 15/16* (2006.01)

(52) U.S. Cl.
USPC ............... 709/250; 709/251; 709/252

(58) Field of Classification Search
USPC .......................... 709/250, 251, 252
See application file for complete search history.

(56) References Cited

U.S. PATENT DOCUMENTS

| | | | | |
|---|---|---|---|---|
| 6,795,434 | B1 * | 9/2004 | Kumar et al. | 370/392 |
| 7,197,661 | B1 * | 3/2007 | Reynolds et al. | 714/4.4 |
| 7,293,117 | B2 * | 11/2007 | Ohta | 710/10 |
| 2004/0003094 | A1 * | 1/2004 | See | 709/227 |
| 2004/0102218 | A1 * | 5/2004 | Nago | 455/558 |
| 2005/0086389 | A1 * | 4/2005 | Chang | 709/250 |
| 2005/0278461 | A1 * | 12/2005 | Ohta | 710/8 |

* cited by examiner

*Primary Examiner* — Umar Cheema
(74) *Attorney, Agent, or Firm* — Trop, Pruner & Hu, P.C.

(57) ABSTRACT

In one embodiment, the present invention includes a component to be coupled to a peripheral device to enable the peripheral device to appear to be locally connected to a computer of a local area network, although the peripheral device is not physically connected to the computer. The component may include a first set of registers to store a mirrored copy of control register information present in a second set of registers of a host controller interface of the computer. Other embodiments are described and claimed.

19 Claims, 2 Drawing Sheets

ENABLING PERIPHERAL COMMUNICATION IN A LOCAL AREA NETWORK

BACKGROUND

As users move to laptops in the home, they increasingly find themselves unable to locate their printer, scanner, external drive or other peripheral next to their computer. As such, the computer and peripheral cannot remain continuously connected, and cannot be physically located together. For example, a user would like the printer in the den while the computer is elsewhere.

Currently, a user can dedicate a second machine to host the peripheral devices, or provide a dedicated device such as a dedicated unit to host the device. In either case the "host" device effectively acts as an embedded computer, connecting to the home local area network (LAN), performing network processing, peripheral processing as needed by the device, and controlling the device through a wired connection. However, dedicated devices tend to be underpowered, hard to configure, and too expensive, so they are infrequently used, keeping the user from placing peripherals where they like.

Conversely, connecting peripheral devices directly to a computer offers great simplicity, and true plug and play capability. Just plug in the device to the computer, and it is recognized and configured. This is the experience that is universally desired, but unavailable to LAN devices that are not directly connected to the computer. Such a direct connection means the peripheral needs a separate wire for connection and prevents portability by keeping the peripheral tethered close to the computer.

DETAILED DESCRIPTION

Figure 1:
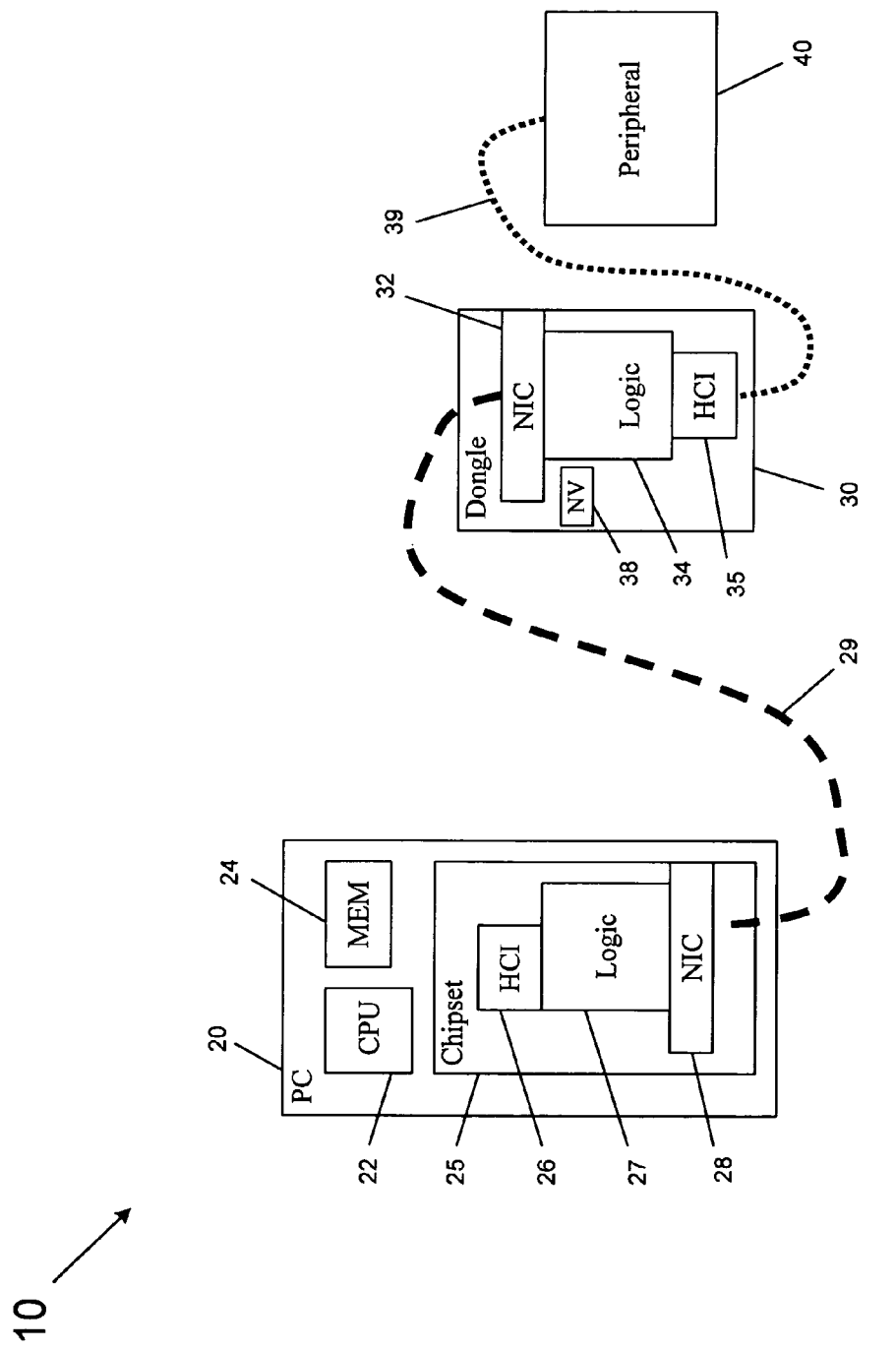
FIG. 1 is a block diagram of a network environment in accordance with an embodiment of the present invention.

Embodiments enable the use of standard peripherals such as universal serial bus (USB) or external serial advanced technology attachment (eSATA) peripherals over a LAN such as a wireless LAN (WLAN) with the same personal computer (PC) experience (e.g., software/drivers) as a locally connected USB or eSATA device. The experience is much the same as a locally connected device, unless limited by network performance. As used herein locally or physically means a direct connection between two components, either via adapters or other connectors present on each device or via a wire connection.

Embodiments pair a set of registers (e.g., one or more control registers of a host controller interface (HCI)) controlling an external peripheral bus, with another set of registers connected to the peripheral. Once these HCIs are paired, changes to one are automatically mirrored in the other by tunneling them through the LAN. Both the PC and peripheral believe and appear to (i.e., are represented to) the other as local, i.e., physically attached, for example, by a wired connection as the communication of control and status information is the same as would be present if the two devices were physically connected. Embodiments may be implemented within a component of the PC (e.g., a PC chipset) and a peripheral dongle or other component to be coupled to the peripheral device and/or within the peripheral itself.

Configuration may be performed by first priming the dongle with information from the PC that will host the peripheral. In one embodiment, this may be realized by connecting the dongle directly to a USB port of the PC. When connected, the dongle is programmed as a USB device with identification information of the host PC. For example, this information may include a host PC's Ethernet (i.e., globally unique) address and/or an internet protocol (IP) (i.e., a non-globally unique address). Further, for enabling secure communications such as by encryption, embodiments may further provide for programming of a secret key.

In various embodiments, the dongle may include a non-volatile storage such as a flash memory or other non-volatile storage to store this information when primed during configuration connection to the PC. Note further that certain information present in the dongle may also be communicated to the PC during this configuration process. For example, in various implementations the dongle itself may include a unique identifier such as a Ethernet address, also stored in this non-volatile storage. Accordingly, during communication with the PC, this address is provided to the PC, e.g., for storage associated with the HCI or other controller of the PC to enable later communication with the dongle, as if it were locally attached. While described as a USB implementation, the scope of the present invention is not limited in this regard.

The dongle is then removed, and plugged into the peripheral, and into the LAN connecting it to the PC. To the peripheral, the dongle appears as a USB host controller on the controlling PC. The dongle then senses the arrival of USB packets from the peripheral, creates an Ethernet packet encapsulating this data for the host PC, and sends the packet to the Ethernet address recorded. The LAN routes the packet to the correct Ethernet address. The host PC receives the packet (either over a wired or wireless network) and the chipset within that PC sets its corresponding USB host controller bits to reflect the settings on the dongle. Thus the control register values present in the dongle are mirrored in the host. The PC to peripheral path works the same way. Note that only Ethernet switching is required to move packets between dongle and PC—no IP or transmission control protocol (TCP) setup is required, reducing end user setup and support burdens. In this way, embodiments can provide communication even in the absence of full protocol layers, such as in the absence of an IP layer (e.g., a layer 3) and a dynamic host configuration protocol (DHCP).

Referring now to FIG. 1, shown is a block diagram of a network environment in accordance with an embodiment of the present invention. As shown in FIG. 1, network 10 may be a LAN such as a WLAN, e.g., a home network. In network 10, a PC 20 is present. Furthermore, at least one peripheral 40 may also be within network 10. As an example, the peripheral may be a printer such as a USB-based printer, a storage device such as a hard disk drive, a scanner or so forth. To enable wireless communication between PC 20 and peripheral 40, a dongle 30 may be associated with peripheral 40. Mirrored information from PC 20 may also be present in dongle 30 to enable PC 20 and peripheral 40 to behave as if peripheral 40 is locally (i.e., physically) connected to PC 20.

As shown in FIG. 1, PC 20 includes a processor 22 such as a central processing unit (CPU). A memory such as dynamic random access memory (DRAM) may be coupled to CPU 22, either directly or by way of a chipset 25, which may act as a memory controller, as well as an interface to input/output devices that may be coupled to PC 20. Assume for purposes of explanation that PC 20 is a portable device such as a laptop or other wireless device capable of wireless communication, e.g., according to a given WLAN protocol such as an Institute of Electrical and Electronics Engineers (IEEE) Standard 802.11 (e.g., IEEE 802.11g, published 2003) protocol or another such wireless scheme (generally referred to herein as WiFi).

As further shown in FIG. 1, chipset 25 includes a host controller interface (HCI) 26. Such an interface may be provided to enable chipset 25 to interface with one or more peripheral devices locally coupled to PC 20, e.g., by way of one or more USB ports. However, in various embodiments to enable control of a peripheral device by PC 20 within network 10 and without a direct connection thereto, various information present in HCI 26 may be mirrored within dongle 30. Furthermore, to enable communication within network 10, chipset 25 includes a network interface controller (NIC) 28, which may be a network adapter for wired and/or wireless communication. Further to enable communication between NIC 28 and HCI 26, a logic 27 may be present. Logic 27 may provide tunneling of packets between HCI 26 and NIC 28.

Referring still to FIG. 1, dongle 30 similarly includes a NIC 32, a host controller interface 35 and a logic 34 to couple HCI 35 with NIC 32. In various embodiments, HCI 35 may include identical configuration information to that in HCI 26 to enable control of peripheral 40 within network 10 by PC 20. Dongle 30 further may include a non-volatile storage 38, such as a flash memory or other non-volatile storage device. Non-volatile storage 38 may include the unique identifier for dongle 30, as well as configuration information of PC 20 to enable wireless communications therebetween. Dongle 30 may communicate with PC 20 by way of a medium 29 which, in various embodiments may be a wireless medium, although a wired connection is also possible.

In the embodiment shown in FIG. 1, dongle 30 may couple to peripheral 40 by a wired connection 39 such as a USB connection, although the scope of the present invention is not limited in this regard. Note that peripheral device 40 may thus avoid the need for a full communication protocol stack such as a TCP/IP protocol stack. Still further, peripheral 40 can avoid the need for expensive processors to handle such a stack. Even more, peripheral 40 need not act as a root device such as a USB root. Accordingly, peripheral device 40 need not perform any conversions of data. Instead, any conversions to enable wireless communication may occur using dongle 30 rather than the peripheral itself. In this way, for example, a low-performance, low-cost USB peripheral device such as a printer or external hard drive can communicate using a USB protocol with dongle 30, which in turn can convert or tunnel those packets to an Ethernet or other such protocol for communication within LAN 10. Thus when dongle 30 is coupled to peripheral 40, USB communications can occur between these two devices, as peripheral 40 believes it is locally attached to PC 20. As such, there is no need for an installation program to run on PC 20 to enable communication with a peripheral connected in this manner.

The PC operating system (OS) configures and uses the peripheral device as if it was a local device. Processing takes place on the PC hosting the device. Thus the user interface is identical to that seen with a local peripheral. Peripheral processing (for example, the file system) is also kept on the local PC, giving the user access to the highest performing processor for faster operation for peripherals like hard drives. In embodiments in which a dongle implementation is present, this device can be made very cheaply since its processing requirements are minimal. The device can be shared by the host PC using standard OS sharing mechanisms.

Simplified but less secure operation can be provided by allowing the dongle to broadcast the contents of its USB host controller to the entire LAN. Any PC on the LAN can receive those signals and decide to act as the host for the USB device. Once a device decides to host, it may send a signal back to the dongle with the hosting PCs Ethernet and/or IP address, which is then stored in the dongle. Future communications will be between the peripheral dongle and the hosting PC. This method has the added advantage that any PC capable of seeing the device can act as the host. Thus if one device becomes inaccessible, another can host by configuring the dongle to another host. Embodiments in which the dongle is embedded in the peripheral are also possible.

Figure 2:
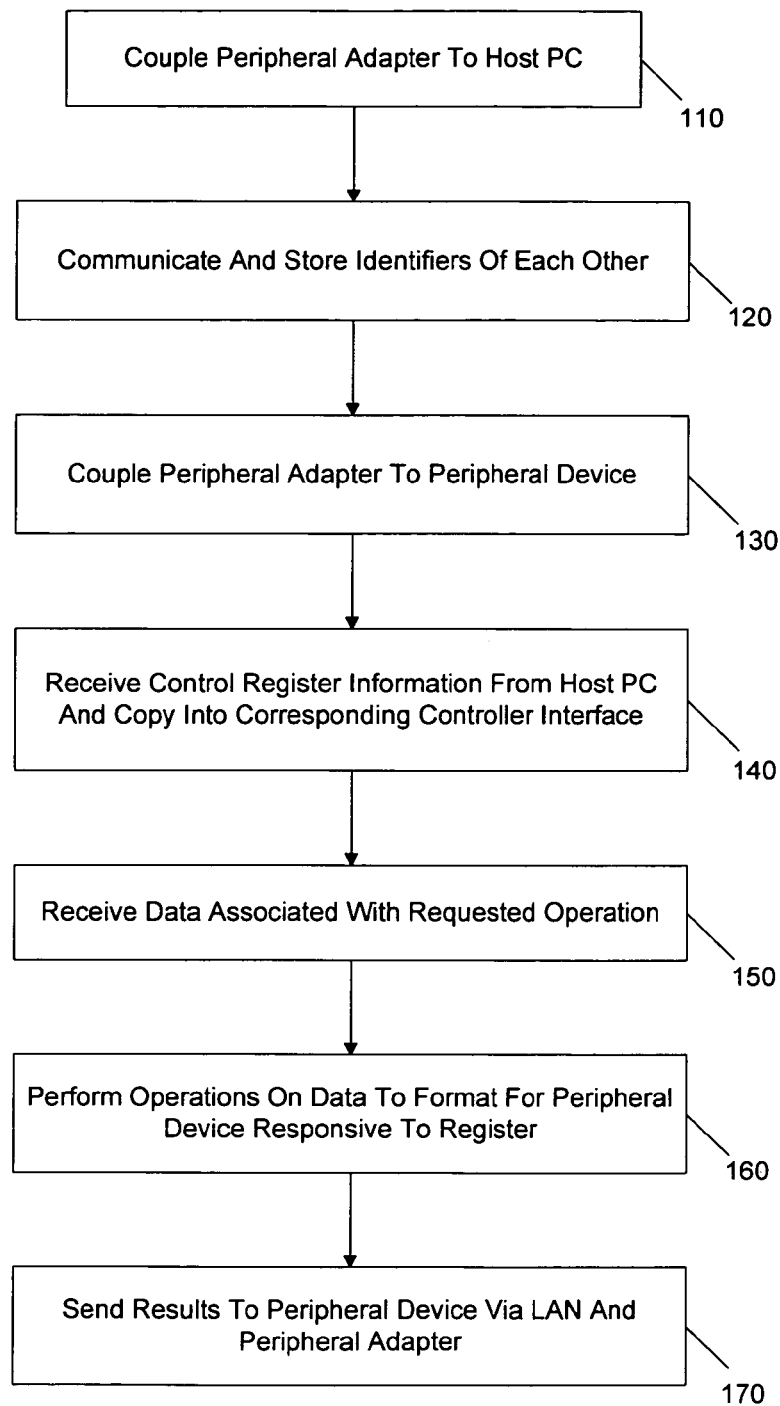
FIG. 2 is a flow diagram of a method in accordance with one embodiment of the present invention.

Referring now to FIG. 2, shown is a flow diagram of a method in accordance with one embodiment of the present invention. As shown in FIG. 2, method 100 may be used to configure a peripheral adapter such as a dongle or other adapter associated with a peripheral (which may be within the peripheral itself) to enable wireless communication.

As shown in FIG. 2, method 100 begins by coupling the peripheral adapter to the host PC (block 110). For example, such connection may be by a USB connection. Then, these two devices may communicate with each other to store identifiers within non-volatile memories (block 120). As discussed above, Ethernet addresses, IP addresses, and a secret key, for example of the other device, may be stored in the devices.

Referring still to FIG. 2, control passes to block 130 where user may then couple the peripheral adapter to the peripheral device itself (assuming the peripheral adapter is not within the peripheral device). Next, normal operation may occur. Accordingly, during communications in which the peripheral device is to receive data from the PC (or vice-versa), control register information of the controller interfaces between the two devices may be mirrored. Accordingly, in the case of a downstream communication from PC to peripheral device, such as for a print operation, control register information to enable a print command and other such information may be mirrored across the network to the controller interface in the peripheral adapter (block 140).

Referring to block 150, data associated with a requested operation (e.g., a print job) may be received in the PC (such as from a memory) and operations may be performed on the data, e.g., to put it in the proper format responsive to the request (block 160). Note that the order of blocks 150 and 160 and prior block 140 may be different, in some embodiments. Then, the data to be printed, along with various print commands may be sent as results of the operations performed on the PC to the peripheral device via the LAN and the peripheral adapter (block 170), which may occur by tunneling packets over the network (e.g., encapsulating commands in an Ethernet packet). Then the peripheral adapter may tunnel these data packets, which may be received in Ethernet format, into, e.g., a USB format for communication along the USB connection from the peripheral adapter to the peripheral device or a SATA format for communication along a SATA connection from the peripheral adapter to the peripheral device, to enable such operation. For example, the peripheral adapter may strip the Ethernet header and use the packet to set its local HCI which is then sent to the peripheral over the USB connection. Note that if an incoming message is from a system having an address other than the address programmed into its non-volatile memory, the peripheral adapter may reject the message. While shown with this particular implementation in the embodiment of FIG. 2, the scope of the present invention is not limited in this regard.

Embodiments thus enable distributed peripherals with the same superior end user experience as a direct connection, with no additional software. Accordingly, peripheral processing may be performed on the host computer CPU for fastest operations with lowest cost peripherals. Embodiments further save a user money, as the user does not need a new processor for every network connected peripheral; instead, an inexpensive local peripheral without such a processor can be used. As such, home users can move to laptops. With their peripherals hosted over wireless LANs, home users can now move from desktops to laptops and keep their peripherals where they want them. By mirroring the USB host controller settings across the LAN, low cost, software transparent peripheral control and access across the LAN can be realized. Embedding point-to-point communication in the dongle and the chipset enables communication that is easy to configure when layer 2 (i.e., Ethernet) connectivity is available, without the need for higher protocol layers such as TCP or IP.

Secure communication thus can be enabled by plugging the dongle first into the PC and then using the same dongle, plugged into the peripheral and the LAN, easing configuration since there is no need to perform extensive configuration operations, such as logging into a web page to configure the device or using a dynamic host configuration protocol (DHCP) server.

Embodiments thus enable peripherals to be placed far from the PC, by tunneling physical changes to host controller registers on the PC to an identical set of registers on or near the device, and vice-versa, through the LAN. No software (e.g., drivers, applications) or peripheral hardware changes are required. Peripheral computation such as print spooling, file system operations such as to block translations, scanner control, and so forth can still take place on the PC. Accordingly, communication between PC and peripheral hardware can occur in a highly secure manner with no end user configuration. For example, such communication can be at the Ethernet or WiFi level, obviating the need for IP, TCP and higher level protocol configuration.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a component to be coupled to a peripheral device or within the peripheral device, to enable the peripheral device to communicate with a computer of a local area network (LAN) without using a full communication protocol stack, a link layer, or dynamic host configuration protocol (DHCP);
wherein the peripheral device is located remotely from the computer and is not directly connected to the computer;
wherein the component includes (a) a first set of registers to store a mirrored copy of control register information present in a second set of registers of a host controller interface of the computer; (b) a network adapter to communicate within the LAN via a first protocol; and (c) a host controller interface (HCI) including the first set of registers, the HCI to communicate with the peripheral device via a second protocol.

2. The apparatus of claim 1, wherein the apparatus comprises a portable dongle to be coupled to a universal serial bus (USB) port of the peripheral device.

3. The apparatus of claim 2, wherein the portable dongle is to communicate with the computer wirelessly via the LAN.

4. The apparatus of claim 1, wherein the component comprises:
a first logic to couple the network adapter and the HCI, the first logic to tunnel information between the network adapter and the HCI.

5. The apparatus of claim 4, wherein the component is to receive a packet of the second protocol from the peripheral device and to encapsulate the packet into a network packet of the first protocol for communication to the computer.

6. The apparatus of claim 4, wherein the component further includes a non-volatile storage to store at least one of a first unique address associated with the computer and a second unique address of the component.

7. The apparatus of claim 6, wherein the component is to be coupled to a port of the computer for programming of the non-volatile storage of the component with the first unique address.

8. The apparatus of claim 7, wherein the non-volatile storage is to further store a secret key to be received from the computer during the programming, and wherein the secret key is used to encrypt and decrypt information subsequently sent between the computer and the component.

9. The apparatus of claim 1, wherein (a) the component is to receive via the LAN a result of peripheral processing performed by the computer for the peripheral device and to send the result to the peripheral device, and (b) the peripheral device includes no processor and uses no processor to communicate within the LAN other than a processor included in the computer.

10. The apparatus of claim 9, wherein the computer is to perform print spooling and printer control operations for the peripheral device, wherein the peripheral device is a printer.

11. A method comprising:
programming a non-volatile storage of a peripheral adapter with identification information of a host computer with which a peripheral device associated with the peripheral adapter is to wirelessly communicate;
communicating control register information between the peripheral adapter and the host computer such that a first host controller interface (HCI) of the peripheral adapter and a second HCI of the host computer have mirrored settings so that the peripheral device is represented to the host computer to be locally connected thereto, although the peripheral device is not directly connected to the host computer; and
performing an operation on the peripheral device responsive to data received from the host computer via the peripheral adapter;
wherein the peripheral device includes no processor and uses no processor, for performing the operation or communicating the control register information, other than a processor included in the host computer.

12. The method of claim 11, further comprising wirelessly receiving the data at the peripheral adapter from the host computer.

13. The method of claim 12, further comprising receiving a packet of a first protocol from the peripheral device and encapsulating the packet into a network packet of a second protocol for wireless communication to the host computer.

14. The method of claim 11, wherein the data includes information regarding file system operations performed by the host computer for the peripheral device, wherein the peripheral device is a disk drive.

15. The method of claim 11, further comprising coupling the peripheral adapter to a port of the host computer to perform the programming, wherein the identification information includes a first unique address of the host computer and a secret key to enable encryption of data communicated between the host computer and the peripheral adapter.

16. The method of claim 11, wherein programming the non-volatile storage comprises coupling the peripheral device to the host computer, wherein the peripheral adapter is within the peripheral device, the peripheral adapter including a network adapter to communicate with the host computer in a wireless area network via a first protocol, the first HCI including a first set of registers and to communicate with the peripheral device via a second protocol, and a first logic to couple the network adapter and the first HCI, the first logic to tunnel information between the network adapter and the first HCI.

17. The method of claim 11, wherein performing the operation on the peripheral device includes performing the operation without using a full communication protocol stack, internet protocol layer 3, or a dynamic host configuration protocol (DHCP).

18. The method of claim 11, wherein communicating the control register information includes communicating the control register information without using a full communication protocol stack, internet protocol layer 3, or a dynamic host configuration protocol (DHCP).

19. The method of claim 11 comprising, after the first and second HCIs have mirrored settings, changing a setting in one of the first and second HCIs and automatically mirroring the change in the other of the first and second HCIs.

* * * * *